May 18, 1943. C. R. RAU 2,319,518
PIPE JOINT OR COUPLING
Filed Dec. 26, 1941 3 Sheets-Sheet 1

Inventor
CHARLES R. RAU,
By Martin T. Fisher,
Attorney.

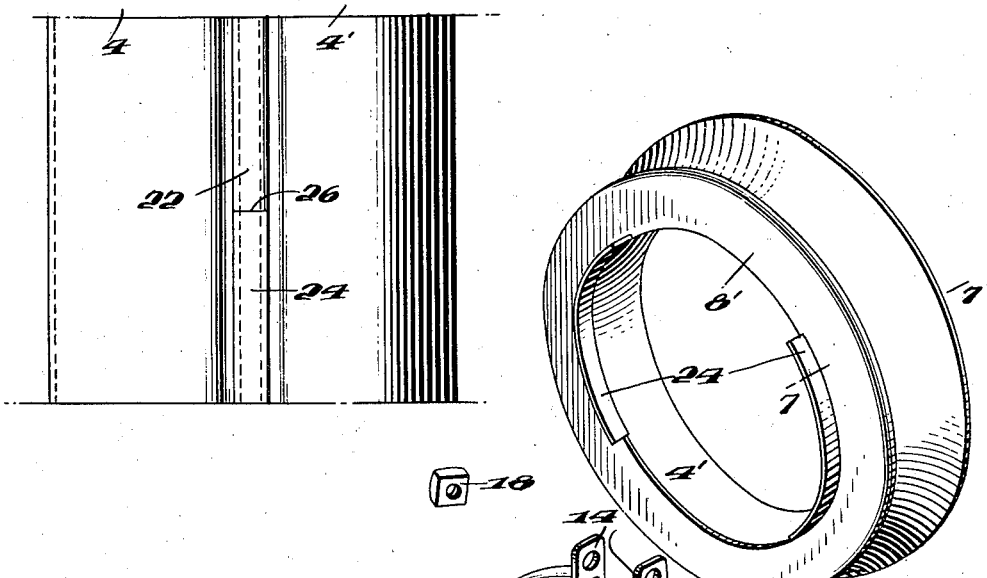
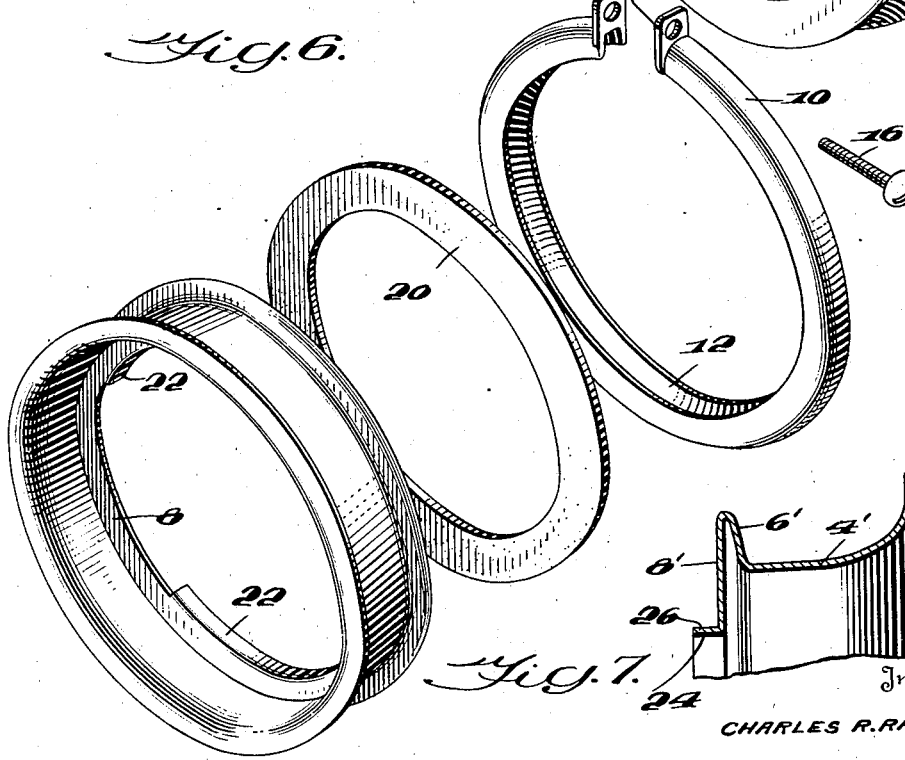
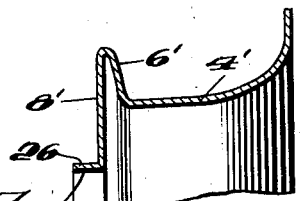

May 18, 1943. C. R. RAU 2,319,518
PIPE JOINT OR COUPLING
Filed Dec. 26, 1941 3 Sheets-Sheet 3
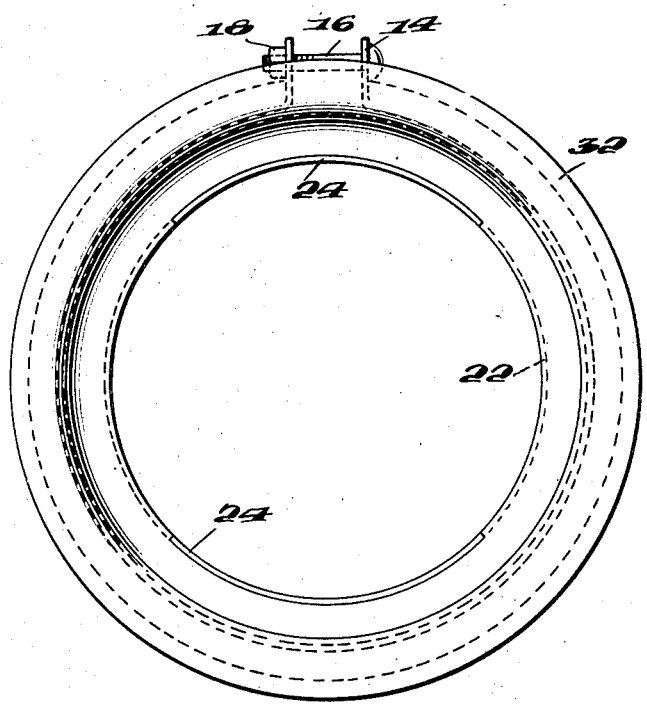
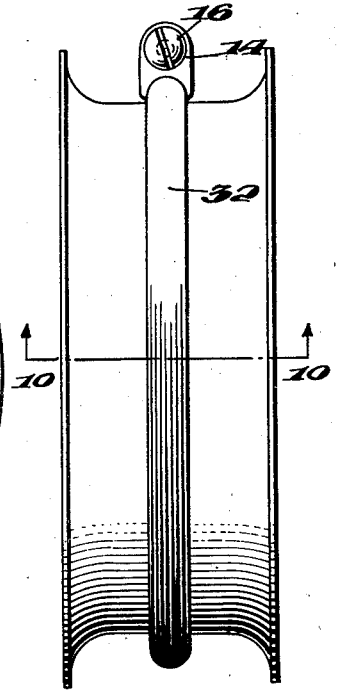
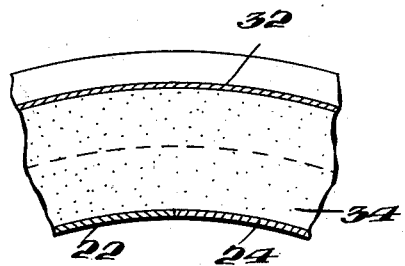
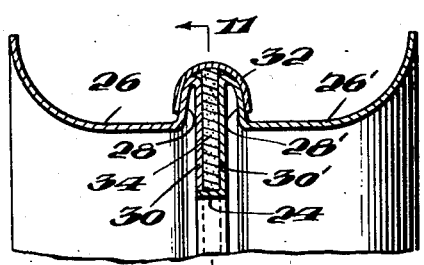
CHARLES R. RAU,
Inventor
By Martin T. Fisher,
Attorney.

Patented May 18, 1943

2,319,518

UNITED STATES PATENT OFFICE 2,319,518

PIPE JOINT OR COUPLING

Charles R. Rau, Chattanooga, Tenn., assignor to Samuel Stamping and Enameling Company, Chattanooga, Tenn., a corporation of Tennessee Application December 26, 1941, Serial No. 424,518

6 Claims. (Cl. 285—129)

This invention relates to pipe joints and is a novel type of coupling for coupling together the tubular units used in the construction of built-up heaters and furnaces, in which it is customary to secure several tubular heating units together in a composite structure. The joint or coupling is, however, of more general application, for coupling together tubular units, particularly tubes of sheet metal used for flue gases, hot air and the like.

In the construction of previous heating units involving a number of connected tubular members, as, for example, in gas furnaces, it was considered necessary to provide these connected sections with either bolted, welded, brazed, or swaged joints. Such joints involved a great deal of hand-labor in assembly and disassembly. It is an object of this invention to provide a joint which is readily assembled and disassembled, by the provision of abutting flanges, preferably separated by a packing ring, the flanges being secured in abutting relation by an external collar which draws the elements together for completing a tight joint.

It is a further object to provide a joint of this type which will be comparatively easy to fabricate and which may be connected and disconnected with a minimum of effort and without disturbing the construction of adjacent units which are supported and connected by this joint. This feature is particularly useful in assembling the interior tubular elements used in heaters and furnaces, particularly in the so-called "floor furnaces," which are usually gas fired.

Another object of the invention is to provide a joint of the type here involved with interlocking means.

The invention will now be described in more detail by reference to the accompanying drawings, illustrating the present preferred embodiment of the invention. In these drawings, Fig. 1 is a vertical sectional view of a portion of a heater utilizing the coupling of the present invention;

Fig. 5 is an enlarged plan view of the joint as viewed from the central axis;

Fig. 6 is an exploded perspective view of the several parts of the joint before assembly;

Fig. 7 is a section on the line 7—7 of Fig. 6.

Fig. 8 is an end view of the coupling, not formed as part of the heater;

Fig. 9 is a side view of the same;

Fig. 10 is a section on the line 10—10 of Fig. 9; and

Fig. 11 is a section on the line 11—11 of Fig. 10.

Figure 1:
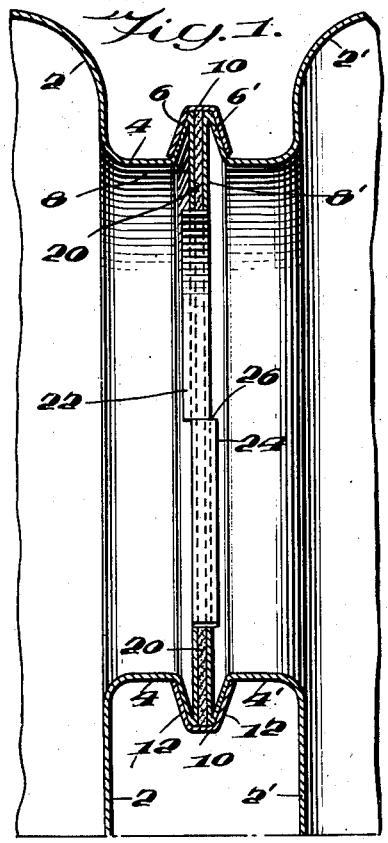
Figure 2:
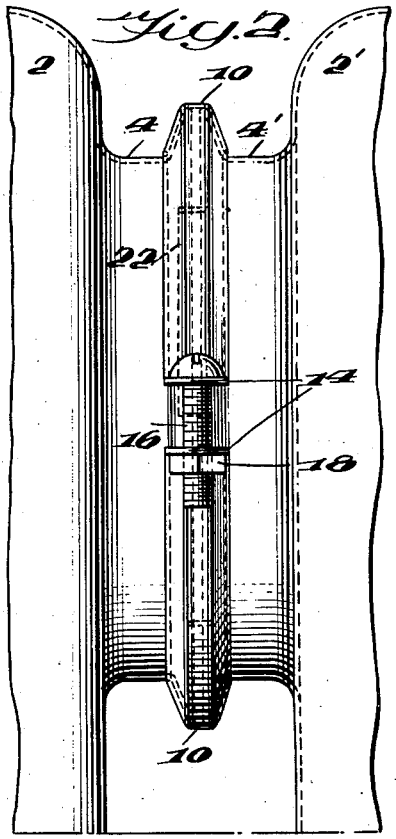
Fig. 2 is a side view of the same.
Figure 3:
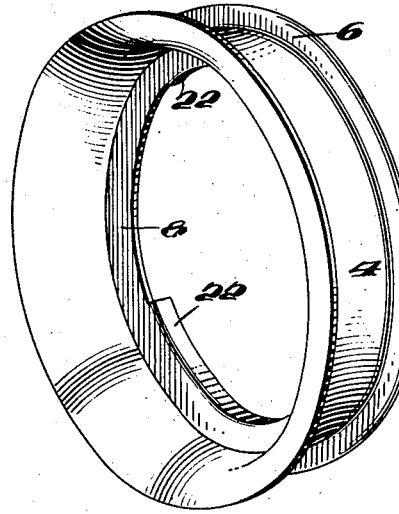
Fig. 3 is a perspective view of the left-hand member of the joint or coupling.
Figure 4:
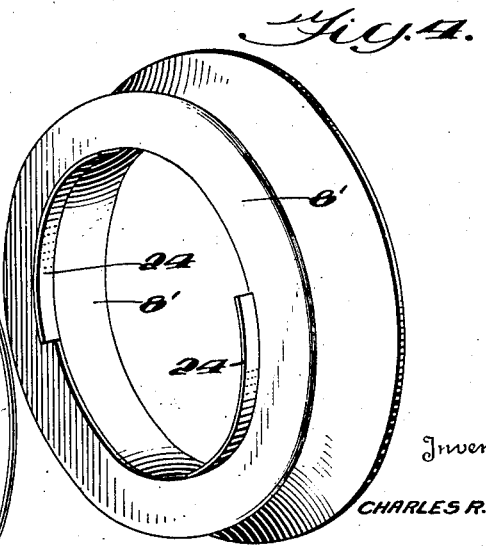
Fig. 4 is a perspective view of the right-hand member of the same.

Referring now to these figures, in which similar reference characters indicate similar parts, 2 and 2' are flue forming portions of a heater, preferably made of sheet metal. These portions are provided with integral annular narrowed portions 4 and 4' and these in turn merge into the inclined flanges 6 and 6', the outward surfaces of which converge outwardly. The flanges 6 and 6' are bent inwardly to form inwardly extending flanges 8 and 8', which flanges are substantially perpendicular to the longitudinal axis of the flue forming parts 4 and 4'.

In order to press the facing flanges 8 and 8' into abutting relationship, there is provided a contractile collar 10, which is trough-shaped, comprising side flanges 12 which converge outwardly at about the same angle as the flanges 6 and 6'. The contractile collar 10 is provided with apertured flanges 14, and the collar is tightened up by a bolt and nut 16 and 18 cooperating with these flanges. Evidently when the collar is contracted, the inner surfaces of the members 12 of the collar will have a cam action against the outer surfaces of the flanges 6 and 6' and press flanges 8 and 8' toward each other. If the flanges 8 and 8' are accurately formed a fairly tight joint may be had without a gasket, but preferably a gasket 20 of asbestos, leather or other suitable material is placed between the flanges 8 and 8'.

In order to interlock the two portions of the coupling with each other and to strengthen and immobilize the joint, the two halves of the joint are provided with arcuate flanges 22 and 24 in staggered relationship. These flanges are preferably carried by the inner edges of the flanges 8 and 8' and extend longitudinally of the pipe and as shown particularly in Fig. 1, the flanges just pass each other with the narrow edge 26 of one flange against the narrow edge of the other flange, thereby interlocking with each other to strengthen and immobilize the joint.

Referring to Figs. 8 to 11, the joint there shown is a more general application, in that it is not shown as built into a heater. In this form there is also illustrated, in Fig. 10, a modification wherein the portions 26 and 26' are provided with outwardly extending integral converging flanges 28 and 28', the outer surfaces of 28 and 28' being curved instead of straight as in Fig. 1. Flanges 28 and 28' are integral with inwardly extending parallel flanges 30 and 30', which are provided with interlocking flanges 22 and 24 as heretofore described.

The contractile collar 32 is curved to about the same curvature as the outer surfaces of the flanges 28 and 28' so that when the collar is contracted these contacting surfaces will cooperate to press flanges 30 and 30' toward each other and to compress the gasket 34 placed therebetween.

There is thus formed a very simple, strong rugged joint which can be quickly assembled and disassembled, the portions of which interlock to make a strong, rigid joint, rendered gastight by the use of a gasket. The flanges 8 and 8' or 30 and 30', as the case may be, extend in a plane substantially perpendicular to the axis of the pipe or joint, thereby cooperating to form an annular stiffening rib, greatly adding to the strength and stiffness of the coupling.

While the invention has been described in some detail, it should be understood that the invention is not limited to the precise details shown but that it may be carried out in other ways.

I claim:

1. A pipe coupling comprising flanges which extend diagonally outwardly from the body of the pipe and are then bent toward each other to form a substantially U-shaped bend and to provide complemental inwardly extending flanges facing each other, and a contractile collar having inner converging walls, which walls are engageable with the diagonally extending portions of said flanges, for drawing said complemental flanges toward each other when said collar is tightened.

2. A pipe coupling comprising flanges which extend diagonally outwardly from the body of the pipe and are then bent toward each other to form a substantially U-shaped bend and to provide complemental inwardly extending flanges facing each other, a contractile collar having inner converging walls, which walls are engageable with the diagonally extending portions of said flanges, for drawing said complemental flanges toward each other when said collar is tightened, and a gasket positioned and gripped between said complemental flanges.

3. A joint or coupling for a pair of pipes comprising complemental flanges in facing relationship, each in a plane substantially perpendicular to the axis of the pipe, the peripheries of said flanges being provided with sectional locking projections, each having a shouldered end, said flanges extending in a direction substantially parallel to the axis of the pipe, whereby, when assembled, said locking projections interengage to prevent relative rotation between the pipes.

4. A pipe coupling comprising flanges which extend diagonally outwardly from the body of the pipe and then are bent toward each other to form a substantially U-shaped bend and to provide complemental flanges facing each other, said flanges meeting in a plane substantially perpendicular to the axis of the pipe, the peripheries of said flanges being provided with sectional locking projections, each having a shouldered end, said flanges extending in a direction substantially parallel to the axis of the pipe, whereby, when assembled, said locking projections interengage to prevent relative rotation between the pipes.

5. A pipe coupling comprising flanges which extend diagonally outwardly from the body of the pipe and then are bent toward each other to form a substantially U-shaped bend and to provide complemental flanges facing each other, said flanges meeting in a plane substantially perpendicular to the axis of the pipe, the peripheries of said flanges being provided with sectional locking projections, each having a shouldered end, said flanges extending in a direction substantially parallel to the axis of the pipe, whereby, when assembled, said locking projections interengage to prevent relative rotation between the pipes, and a contractile collar having inner converging walls, which walls are engageable with the diagonally extending portions of said flanges, for drawing said complemental flanges toward each other when said collar is tightened.

6. A pipe coupling comprising flanges which extend diagonally outwardly from the body of the pipe and then are bent toward each other to form a substantially U-shaped bend and to provide complemental flanges facing each other, said flanges meeting in a plane substantially perpendicular to the axis of the pipe, the peripheries of said flanges being provided with sectional locking projections, each having a shouldered end, said flanges extending in a direction substantially parallel to the axis of the pipe, whereby, when assembled, said locking projections interengage to prevent relative rotation between the pipes, a contractile collar having inner converging walls, which walls are engageable with the diagonally extending portions of said flanges, for drawing said complemental flanges toward each other when said collar is tightened, and a gasket positioned and gripped between said complemental flanges.

CHARLES R. RAU.